(12) United States Patent
D'Ottaviano

(10) Patent No.: US 10,201,951 B2
(45) Date of Patent: Feb. 12, 2019

(54) RIGID THERMOPLASTIC FOAM DENSIFICATION PROCESS AND COMPOSITE STRUCTURES INCORPORATING THE DENSIFIED RIGID THERMOPLASTIC FOAM

(71) Applicant: Dow Global Technologies LLC, Midland, MI (US)

(72) Inventor: Fabio O. D'Ottaviano, Hirzel (CH)

(73) Assignee: Dow Global Technologies LLC, Midland, MI (US)

( * ) Notice: Subject to any disclaimer, the term of this patent is extended or adjusted under 35 U.S.C. 154(b) by 67 days.

(21) Appl. No.: 15/103,260

(22) PCT Filed: Dec. 12, 2014

(86) PCT No.: PCT/US2014/070016
§ 371 (c)(1),
(2) Date: Jun. 9, 2016

(87) PCT Pub. No.: WO2015/094967
PCT Pub. Date: Jun. 25, 2015

(65) Prior Publication Data
US 2016/0311196 A1    Oct. 27, 2016

Related U.S. Application Data

(60) Provisional application No. 61/918,500, filed on Dec. 19, 2013.

(51) Int. Cl.
*B29C 44/56* (2006.01)
*B32B 5/18* (2006.01)
(Continued)

(52) U.S. Cl.
CPC ............ *B32B 5/18* (2013.01); *B29C 44/5636* (2013.01); *B32B 5/14* (2013.01); *B32B 7/12* (2013.01);
(Continued)

(58) Field of Classification Search
CPC .................................................. B29C 44/5636
See application file for complete search history.

(56) References Cited

U.S. PATENT DOCUMENTS

| 3,863,908 A | 2/1975 | Charpentier |
| 7,357,974 B2 | 4/2008 | Rockwell |

(Continued)

FOREIGN PATENT DOCUMENTS

| EP | 2634210 | * 3/2012 | ............ B29C 44/22 |
| GB | 1240733 A | 7/1971 | |

(Continued)

*Primary Examiner* — Matthew J Daniels
*Assistant Examiner* — Kimberly A. Stewart

(57) ABSTRACT

Styrenic polymer foams having one or two densified major surfaces are produced by applying heat and pressure (4) to such surfaces to soften the polymer and collapse cells adjacent to said surface to form a densified skin on such surface. The heated surface or surfaces are then cooled under pressure to form a foam having an undensified core (7) and densified skins (5) on one or both sides. The partially densified foams are especially useful for forming laminates in which the foam forms a core. Adhesion to external layers (30,32) is improved due to the presence of the densified layer.

10 Claims, 3 Drawing Sheets

(51) Int. Cl.
  *E04C 2/24* (2006.01)
  *B32B 7/12* (2006.01)
  *B32B 27/06* (2006.01)
  *B32B 27/20* (2006.01)
  *B32B 27/36* (2006.01)
  *B32B 27/40* (2006.01)
  *B32B 5/14* (2006.01)
  *B32B 17/06* (2006.01)
  *B29K 25/00* (2006.01)
  *B29K 105/04* (2006.01)
  *B29L 31/10* (2006.01)

(52) U.S. Cl.
  CPC .......... *B32B 17/066* (2013.01); *B32B 27/065* (2013.01); *B32B 27/20* (2013.01); *B32B 27/36* (2013.01); *B32B 27/40* (2013.01); *E04C 2/243* (2013.01); *E04C 2/246* (2013.01); *B29K 2025/06* (2013.01); *B29K 2105/04* (2013.01); *B29L 2031/10* (2013.01); *B32B 2250/40* (2013.01); *B32B 2262/101* (2013.01); *B32B 2266/0228* (2013.01); *B32B 2307/304* (2013.01); *B32B 2509/10* (2013.01)

(56) References Cited

U.S. PATENT DOCUMENTS

| | | | |
|---|---|---|---|
| 2003/0008127 | A1* | 1/2003 | Stimler .................. B29C 44/22 428/304.4 |
| 2009/0179348 | A1* | 7/2009 | Wong .................. B29C 44/5636 264/293 |
| 2009/0246501 | A1 | 10/2009 | Shuler |
| 2011/0229693 | A1* | 9/2011 | Maurer ................. B29C 44/352 428/159 |

FOREIGN PATENT DOCUMENTS

| | | |
|---|---|---|
| JP | S56-2134 A | 1/1981 |
| WO | 2001/056773 A | 8/2001 |

* cited by examiner

RIGID THERMOPLASTIC FOAM DENSIFICATION PROCESS AND COMPOSITE STRUCTURES INCORPORATING THE DENSIFIED RIGID THERMOPLASTIC FOAM

The present invention relates to a method for forming a densified layer on a rigid foam body and to composite structures that incorporate the resulting rigid foam body.

Rigid thermoplastic polymer foams such as foamed polystyrene are used extensively as thermal insulation materials for buildings, walk-in refrigerators and freezers and refrigerated vehicles. The rigidity of these foams is important, because this allows the foam to contribute to the overall mechanical strength of the structure.

In some cases, the polymer foam forms a core layer which is laminated to additional layers of other materials to form a composite structure. An example of this is a sandwich panel for refrigerated vehicles. These sandwich materials have a core layer of a polystyrene foam. The outer layers of this sandwich structure are often glass-reinforced plastic (GRP) layers, which provide a hard and smooth exterior surface that is important cosmetically and structurally.

It would be desirable for cost and other reasons to bond the GRP layers directly to the polystyrene foam. Unfortunately, the product frequently fails when this is done. This is partly due to imperfections in the manufacturing process, in which adequate adhesion between the GRP and foam layers is not achieved, leading to localized areas (debond patches) where the GRP and foam layers are not adhered. Over time, as the product is exposed to environmental heating and cooling as well as mechanical stresses, these debond patches can expand. When this happens, large blisters develop between the GRP and foam layers, leading to cosmetic and/or mechanical failure of the structure.

The industry's solution to this problem has been to insert wood layers between the foam and GRP, converting a three-layer structure into a five-layer one. Debond patches may still form when the GRP is applied to a hard, densified surface such as wood, but the patches are more resistant to expanding to form large blisters. This reduces the problem at the expense of higher cost and greater mass. The addition of the wood layers also increases the thickness of the panel; if the five-layer panel must have the same thickness as a three-layer panel, the thickness of the foam layer must be reduced, which reduces the thermal insulation value of the panel.

The adhesion problem is essentially one of cohesive failure at the surface of the polymer foam where, due to the low foam density, the stresses exceed the mechanical strength of the polymer material. One way to address this issue is to increase the foam density at the foam surface, i.e., provide a surface layer of high density material. Multilayer foam products have been developed for this purpose. These are made by separately producing high density foam sheets and laminating them to a lower density core. This approach adds significant expense, as separate foam products need to be made and then assembled. In addition, there is the difficult problem of obtaining an adequate adhesive bond across a large surface area on either side of the foam core.

A better approach in principle would be to provide a monolithic foam panel that has a low core density and a densified skin on one or both sides. Methods have been developed to make foam materials having densified surfaces by heat-softening the surface of the foam, which allows the cells near the surface to collapse and form a skin layer. For example, WO 2001/056773 describes a process for densifying the surface of a polyethylene foam, in which heat is applied to the foam surface using a hot air knife or an infrared heater. After heating, the foam can be passed through a cooled nip roller to densify and re-solidify the surface. This process is capable of forming very thin skins, but requires multiple passes through the densification process to do so. This process also is not amenable to rigid foams like polystyrene foam.

U.S. Pat. No. 7,357,974 describes a process for forming a thermoplastic blanket having alternating densified and non-densified layers. The densified layers are formed by compressing a low density starting material in a laminator, then heating and melting the surfaces of the compressed material to form the densified layers. The starting material which is densified at the surface is not described as a polymer foam. In any event, this process is not amenable to forming densified layers on a rigid polymer foam, because the initial compression set will permanently deform the foam.

This invention is a process for densifying a surface of a styrenic polymer foam, comprising:

a) applying heat and pressure to at least one surface of a starting monolithic thermoplastic styrenic polymer foam which has a starting thickness of at least 25 mm to locally heat said surface to a temperature above the glass transition temperature of the styrenic polymer and collapse cells adjacent to said surface to form a densified skin on such surface and produce a multilayer monolithic foam having an undensified core having a thickness of at least 5 mm and a volume density of no greater than 80 kg/m$^3$, and at least one densified surface having an area density of at least 0.6 kg/m$^2$ and a volume density of at least 200 kg/m$^3$, and b) while maintaining pressure on the densified surface or surfaces of the multilayer monolithic foam, cooling the heated and densified surface of the multilayer monolithic foam from a temperature above the glass transition temperature of the styrenic polymer to 50° C. or below, the maintained pressure being at least 0.5 kPa but insufficient to permanently deform the undensified core.

The present invention is also a monolithic multilayer styrenic polymer foam having an undensified core having a thickness of at least 5 mm and a volume density of no greater than 80 kg/m$^3$, and at least one densified surface having an area density of at least 0.6 kg/m$^2$ and a volume density of at least 200 kg/m$^3$.

The present invention is also a multilayer laminate, the laminate including a foam core and a glass reinforced plastic sheet bonded to at least one surface of the foam core, wherein the foam core is a monolithic multilayer styrenic polymer foam having an undensified core having a thickness of at least 5 mm and a volume density of no greater than 80 kg/m$^3$, and at least one densified surface having an area density of at least 0.6 kg/m$^2$ and a volume density of at least 200 kg/m$^3$, and further wherein the glass reinforced plastic sheet is bonded to a densified surface of the polymer foam.

Figure 1:
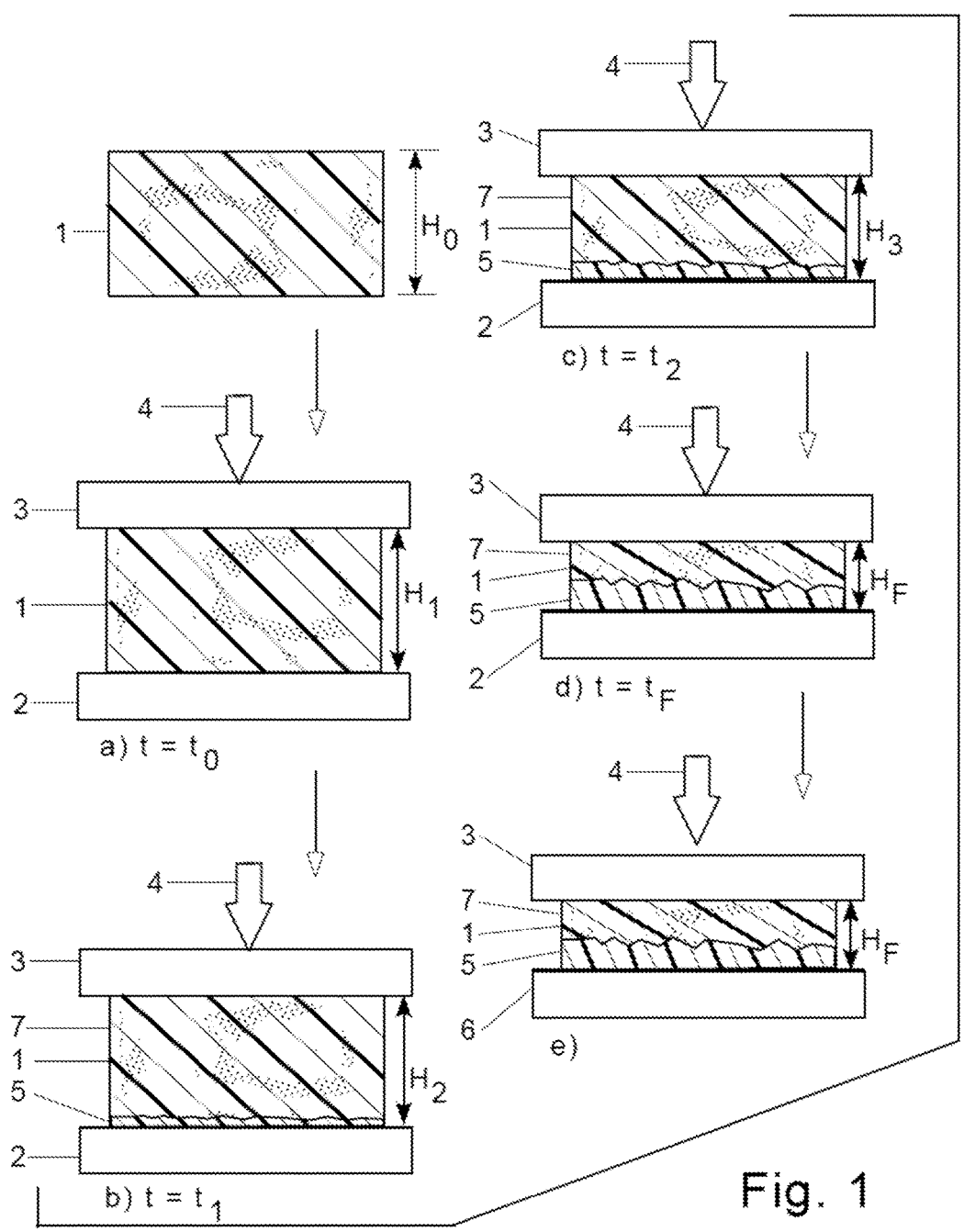
FIG. 1 is a schematic view of an embodiment of the process of this invention.

Turning to FIG. 1, foam body 1 has an initial thickness $H_0$. Foam body 1 is a foamed monolithic thermoplastic styrenic polymer. By "monolithic", it is meant a foam having a continuous polymer phase without seams or joints between sections of the foam. A foam body made in an extrusion process is monolithic in this sense, as is a partially densified foam body made according to the process of this invention from a starting monolithic foam.

The styrenic polymer is characterized as (1) being thermoplastic and (2) being a polymer or copolymer of one or more vinyl aromatic monomers, in which the polymerized vinyl aromatic monomer(s) constitute at least 50% by weight of the polymer or copolymer. The non-brominated styrenic polymer preferably contains at least 70% by weight polymerized vinyl aromatic monomer(s). Vinyl aromatic monomers include styrene, α-methylstyrene, 2- or 4-methylstyrene, dimethyl styrene, 2- or 4-ethylstyrene, diethylstyrene, 2- or 4-isopropylstyrene, 2- or 4-chlorostyrene, dichlorostyrene, trichlorostyrene, vinyl toluene, vinyl naphthalene, divinyl benzene and the like. The styrenic polymer may be a homopolymer of a vinyl aromatic monomer, or a copolymer of two or more vinyl aromatic monomers. Homopolymers of polystyrene are a preferred type of styrenic polymer. In other embodiments, the styrenic polymer is a copolymer of one or more vinyl monomers and one or more other monomers (i.e., monomers that are not vinyl aromatic monomers). Examples of such other monomers include acrylic and methacrylic monomers such as acrylic acid, methacrylic acid, methyl acrylate, methyl methacrylate, ethyl acrylate, ethyl methacrylate, hydroxyethyl acrylate, hydroxyethyl methacrylate and the like; acrylonitrile; maleic anhydride and itaconic anhydride. A preferred comonomer is acrylonitrile. A styrene-acrylonitrile copolymer containing up to 30% by weight polymerized acrylonitrile, especially 8% to 25% by weight polymerized acrylonitrile, is another preferred type of styrenic copolymer. The foam body may be made of a mixture of two or more polymers.

The styrenic polymer can contain additional additives as described, for example, in WO 2012/082332. Such additional additives may include, for example, flame retardants such as described, for example, in U.S. Pat. No. 4,070,336, U.S. Pat. No. 4,086,205, U.S. Pat. No. 4,255,324, U.S. Pat. No. 4,268,459, U.S. Pat. No. 4,278,588, WO 2007/019120, WO 2009/108453, WO 2008/021417, WO 2009/035880 and WO 2009/035881; flame retardant synergists (such as dicumyl or polycumyl) as described, for example, in US 2011-0196053, extrusion aids, cell size control agents including polymers such as polyethylene and polyethylene wax, pigments, inorganic fillers, and infrared attenuating agents (such as carbon black, graphite and titanium dioxide). Useful stabilizers include antioxidants and acid scavengers such as magnesium oxide, epoxy resin(s), phosphite compounds and phosphate compounds. Examples of extrusion aids include plasticizers include, for example, metal salts of stearic acid such as barium stearate.

Prior to densification, foam body 1 has a foam volume density of, for example, 16 to 80 kg/m$^3$, 20 to 65 kg/m$^3$, 24 to 55 kg/m$^3$ or 28 to 45 kg/m$^3$. Foam body 1 prior to densification typically exhibits a compressive strength at yield (in the direction of the applied force during the inventive process) of 600 kPa or less, preferably about 250 to 450 kPa. Foam body 1 may have an elastic limit of 3-10% compression; i.e. the foam compresses more or less linearly with increasing compressive strength until a strain (compression) of 3-10% of initial foam thickness is achieved, after which a yield point is reached, and compressive stress and strain are no longer approximately proportional.

The starting foam thickness is at least 25 mm and preferably at least 40 mm. The starting foam thickness can be as much as 400 mm, but preferably is not more than 160 mm. A preferred starting foam thickness is 40 to 100 mm, and an especially preferred starting foam thickness is 60 to 100 mm.

In the embodiment shown in FIG. 1, heat and pressure are applied to foam body 1 by compressing it between heated platen 2 and press 3. In this embodiment, heated platen 2 has a temperature above the glass transition temperature of the styrenic polymer, whereas press 3 has a lower temperature, so densification occurs only on the bottom surface of foam body 1.

Press 3 exerts a downward pressure on foam body 1. This downward pressure is represented in FIG. 1 by arrows 4. The downward pressure can be provided solely by the weight of press 3. Thus, in simple embodiments, press 3 is simply a flat plate which is laid on top of foam body 1. Alternatively, downward pressure can be applied to press 3 to increase the downward pressure on foam body 1.

The pressure applied to foam body 1 is less than the compressive strength at yield of the starting foam body. Preferably, the applied pressure is at least 50 kPa, and no greater than 300 kPa (but in no case greater than the compressive strength at yield of foam body 1).

The temperature of heated platen 2 is at least the glass transition temperature of the styrenic polymer, and is preferably at least 20° C., at least 40° C. or at least 50° C. greater than that glass transition temperature. The temperature is below that temperature at which the styrenic polymer degrades. A preferred temperature is 140 to 200° C., and a more preferred temperature is 150 to 180° C., although this can vary depending on the particular styrenic polymer.

Heated platen 2 can be any flat heated surface, including a metal plate. Heat can be provided to heated platen 2 by any convenient method, such as radiant heating, infrared heating, resistive heating, contacting platen 2 with a heated thermal fluid (including hot liquids or gasses), and the like.

FIG. 1a) illustrates the beginning of the densification process. In FIG. 1a) foam body 1 is positioned onto heated platen 2, and press 3 is brought onto the top surface of foam body 1 at time t=$t_0$. $t_0$ represents the time at which pressure is first applied to foam body 1 by press 3. Essentially no densification has yet occurred. Because the applied pressure is less than the compressive strength at yield of starting foam body 1, foam body 1 is not compressed beyond its elastic limit by the applied pressure. That is:

$$\frac{(H_0 - H_1)}{H_0} \times 100\% \leq L_e$$

where $H_0$ is the initial (uncompressed) height of foam body 1, $H_1$ is the height of foam body 1 at the start of the process under the applied pressure of heated platen 3, and $L_e$ is the elastic limit of foam body 1. Preferably, $H_1$ is 95 to 100%, more preferably 97 to 100%, of $H_0$ before densification begins.

FIGS. 1b), 1c) and 1d) illustrate the formation of a densified skin layer 5 on the bottom surface of foam body 1 at successive times $t_0 < t_1 < t_2 < t_F$, where $t_F$ represents the time at the conclusion of the heating step. Heated platen 3 melts the polymer at the bottom surface of foam body 1. The gas entrained in the cells at the bottom surface of foam body escapes as the polymer melts, collapsing the foam at the bottom surface of foam body 1 and forming densified layer 5. As seen in FIGS. 1b) through 1d), the thickness of densified layer 5 increases during this heating step, as cells at the bottom surface of foam body 1 collapse. (In FIGS. 1b) through 1d), the thickness of densified layer 5 is exaggerated for purposes of illustration.) The thickness of foam body 1 correspondingly decreases as the heating step continues and more cells at the bottom surface collapse, such that $H_1 > H_2 > H_3 > H_F$.

During the heating process, the downward pressure represented by arrows 4 in FIG. 1 is at all times less than the compressive strength at yield of the remaining cellular layer 7 of foam body 1. Because of this, the reduction in thickness of foam body 1 during the heating step is due to the collapse of cells at the bottom surface rather than compression of the cellular portion 7 of foam body 1. Thus, as the heating step continues, and more cells collapse at the bottom surface of foam body 1, the thickness of foam body 1 decreases, and press 3 drops by a corresponding amount.

The thickness of densified layer 5 is approximately related to the change in thickness of foam body 1 as follows:

$$t_D = \frac{\Delta H}{n} \times \frac{\rho_I}{\rho_D}$$

where $t_D$ is the thickness of densified layer 5, $\Delta H$ is the change in thickness of foam body 1 during the heating step, $\rho_I$ is the initial foam volume density, $\rho_D$ is the volume density of the densified layer and n is 1 when the foam body is densified on one side during the heating step (as shown in FIG. 1) and 2 when the foam body is densified on both sides during the heating step. This relationship allows one to easily estimate the volume density of densified layer 5 from its thickness and the initial density of foam body 1.

The value of $\Delta H$ may be, for example, 5 to 70%, more preferably 25 to 60%, still more preferably 40 to 60% of the initial thickness ($H_0$) of the foam body. In some embodiments, $\Delta H$ is 5 to 60 cm, 10 to 50 cm or 20 to 40 cm.

The densified layer may have a volume density of at least 200 g/m³. The volume density is preferably at least 400 g/m³ and still more preferably at least 600 g/m³. The volume density of the densified layer may be as much as the bulk density of the styrenic polymer.

The densified layer may have an area density (weight per unit surface area) of at least 0.6 g/m², more preferably at least 0.8 g/m². The area density of the densified area can be estimated from the change in thickness of the foam body during the heating step using the relation:

$$AD_D = \frac{\Delta H}{n} \times \rho_I$$

where $AD_D$ is the area density of the densified layer and n, $\Delta H$ and $\rho_I$ are as defined before.

The volume density of cellular portion 7 of foam body is substantially unchanged during the heating step. For example, the volume density of cellular portion 7 of foam body should be not more than 25% greater, preferably no more than 10% greater, and still more preferably no more than 5% greater than the volume density of the starting foam body. In especially preferred embodiments, the volume density of cellular portion of foam body 1 is no more than 102% of the volume density of the starting foam body.

After the desired amount of densification is achieved, the densified layer of foam body 1 is cooled from a temperature above the glass transition temperature of the styrenic polymer to 50° C. or below while maintaining pressure on the densified surface or surfaces. The maintained pressure in the cooling step is at least 0.5 kPa, preferably at least 1.5 kPa, but insufficient to permanently deform the undensified core. This pressure preferably is less than the compressive strength at yield of the initial foam body. It may be, for example, up to 300 kPa.

FIG. 1e) illustrates an embodiment of the cooling step. Foam body 1 as produced in FIGS. 1a) through 1d) is placed between cooling platen 6 and press 3. Cooling platen 6 is at all times during the cooling step below the glass transition temperature of the styrenic polymer. At the conclusion of the cooling step, cooling platen 6 is at a temperature of no greater than 50° C. and preferably is at a temperature of no greater than 25° C. In some embodiments, cooling platen 6 is at a temperature less than 50° C. and preferably less than 25° C. during the entire cooling step. In other embodiments, the temperature of cooling platen 6 is reduced during the course of the cooling step, from a temperature in excess of 50° C. to below 50° C., preferably to below 25° C.

Cooling platen 6 may be the same physical piece of equipment as heating platen 2. In such a case, cooling is provided to heating platen 2/cooling platen 6 after the conclusion of the heating step, reducing its temperature as described above. Cooling can be applied to cooling platen 6 by, for example, by contacting cooling platen with a cold fluid such as cold air or a cooling liquid.

It is important that the partially densified foam body is under the aforementioned pressure as the surface of the densified layer cools from above the glass transition temperature to 50° C. or lower. If the cooling occurs in the absence of the pressure, the densified surface becomes uneven or corrugated. The corrugations cause great difficulty in obtaining a strong bond in cases in which the partially densified foam body is later laminated to a glass reinforced plastic (GRP) or other surface layer.

Thus, if cooling platen 6 of FIG. 1e) is a different piece of equipment than heating platen 2, it is necessary to transfer partially densified foam body 1 from heating platen 2 to cooling platen 6. In such a case, partially densified foam body 1 must be transferred and put under pressure before the temperature of the exposed surface of densified layer 5 drops to below the glass transition temperature of the styrenic polymer.

Essentially no further densification occurs during the cooling step, so the overall thickness of the partially densified foam body ($H_F$ in FIG. 1), the thickness of the undensified portion (7 in FIG. 1) of the foam body, and the thickness of the densified layer (5 in FIG. 1) each are typically within 5% of their respective thicknesses at the end of the heating step.

After the cooling step is completed, the partially densified foam body is removed from the apparatus. Some small elastic rebound may be seen when the pressure is released, leading to a small expansion in the thickness of the partially densified foam body. In most cases, this expansion is less than 5% and more typically is less than 2%. If necessary, the partially densified foam body can be trimmed or otherwise cut into the desired length and width.

Heating platen 2, press 3 and cooling platen 6 all have substantially flat surfaces which contact the major surfaces of the foam body during the heating and cooling processes, as the case may be. The materials of construction are not particularly critical, provided that they can withstand the temperatures and pressures of the process without distortion.

The surfaces of heating platen 2 and/or cooling platen 6 which contact the major surfaces of the foam body during the heating and cooling processes may be roughened if desired. Doing so can impart a small amount of surface roughness to the partially densified foam body. This surface roughness can be expressed in terms of sandpaper grit designations. The surface roughness of heating platen 2, press 3 and/or cooling platen 6, as well as the partially densified foam body, may be, for example, from P40 to P120, preferably P60 to P100 on the ISO/FEPA grit scale.

The process described in FIG. 1 can be inverted, i.e., heating platen 2 can be on top of foam body 1 and press 3 can be below foam body 1.

If a densified layer is desired on both sides of the foam body, the process can be performed twice, the first time densifying one side of the foam body, and then inverting the foam body and densifying the opposite surface.

Figure 2:
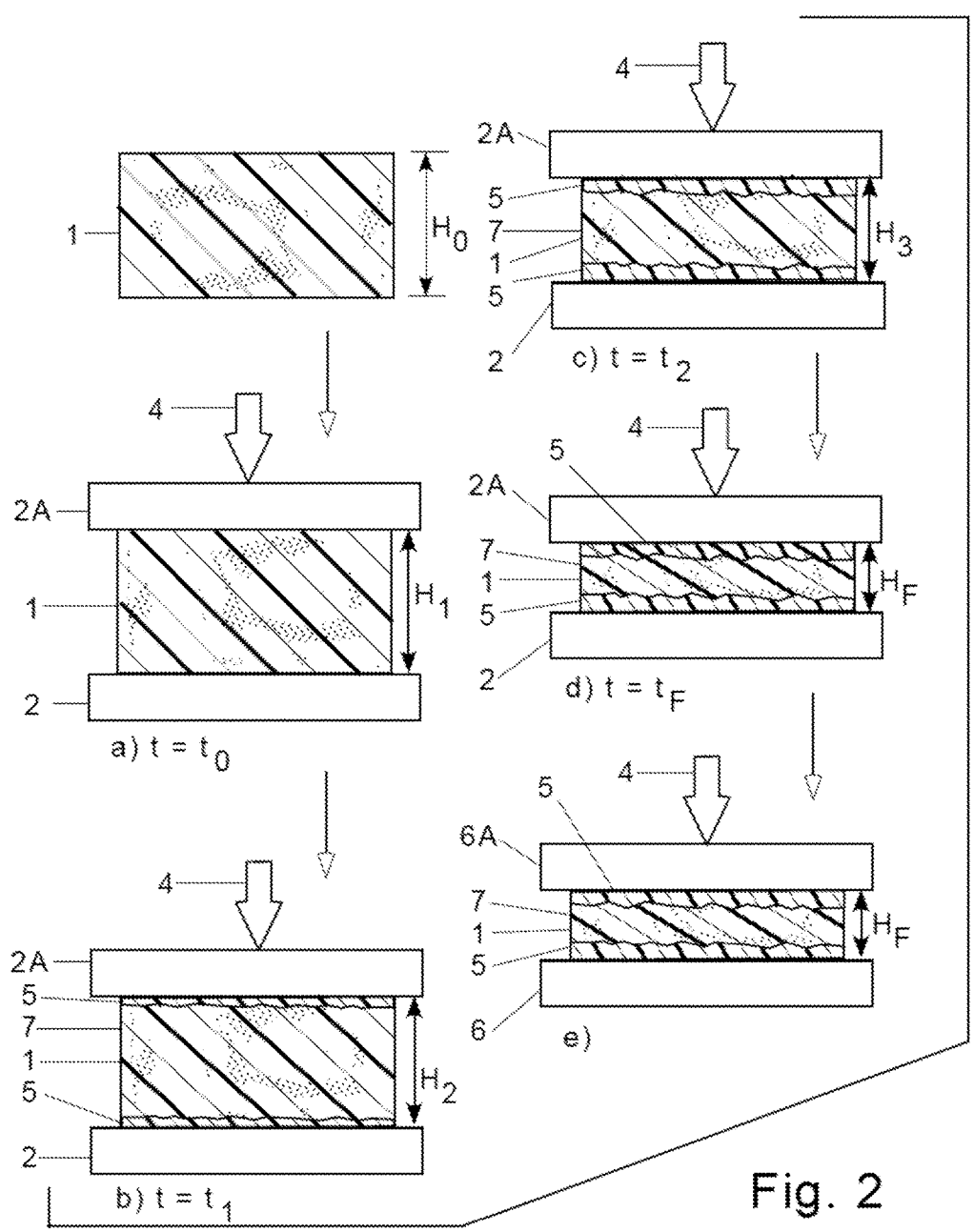
FIG. 2 is a schematic view of a second embodiment of the process of this invention.

It is also possible to densify both surfaces simultaneously by applying heat to opposing surfaces of the foam body. An embodiment of such a process is shown in FIG. 2. Features shown in FIG. 2 correspond to similarly numbered features in FIG. 1. In FIG. 2, starting foam body 1 having thickness $H_0$ is placed between two heated platens 2 and 2A and subjected to pressure as described before. This forms two densified layers 5 on either side of foam body 1 where foam body 1 contacts heated platens 2 and 2A. The heated surfaces of densified layers 5 are cooled simultaneously, in the general method described before, between cooling platens 6 and 6A.

In the process illustrated in FIGS. 1 and 2, the heating or cooling platens and press may form opposing halves of a mold. In such a case the bottom mold half may have a recessed cavity for receiving the starting foam body. The upper mold half in such embodiments will fit into the cavity on top of the foam body to provide the requisite pressure and, if necessary, the requisite heating and/or cooling.

Figure 3:
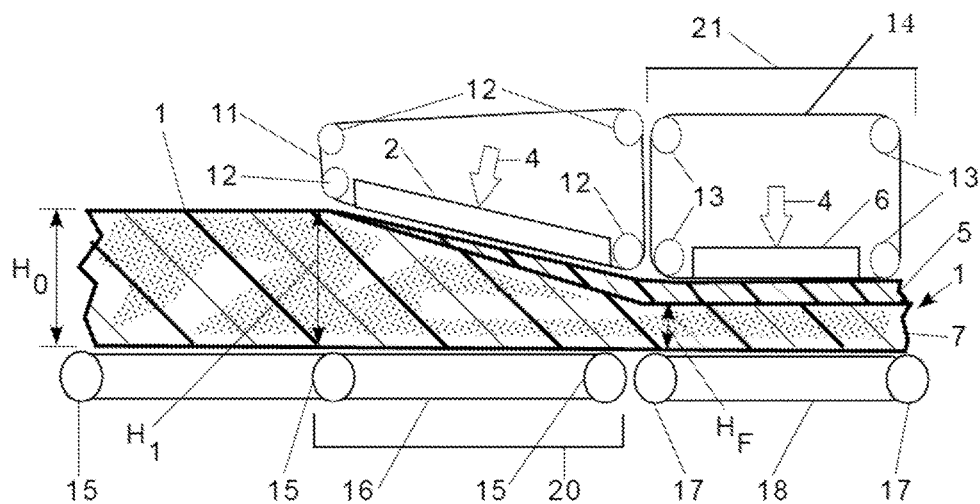
FIG. 3 is a schematic view of a third embodiment of the process of the invention.

An apparatus and method for continuous production of the partially densified foam body is shown in FIG. 3. Features shown in FIG. 3 correspond to similarly numbered features in FIGS. 1 and 2. In FIG. 3, foam body 1 is conveyed through densification zone 20 on a conveyor means such as a series of rollers 15 and moving belt 16. The conveyor means in this embodiment forms a lower surface which supports foam body 1 as downward pressure (represented by arrows 4) is exerted on foam body 1 during the heating and cooling steps. The conveyor means may be, alternatively, a series of drive rollers, a tenter frame, or other moving platform.

In the embodiment shown in FIG. 3, downward pressure is exerted onto foam body 1 in densification zone 20 by a pressure means such as endless belt 11 and a series of rollers 12. The pressure means may be a series of rollers, an inclined sheet of metal or other material, or similar apparatus that transfers heat and pressure to the top surface of foam body 1 as described before. The pressure means and conveyor means define an increasingly restricted vertical opening through which foam body 1 is moved. Heat is applied to the top surface of foam body 1 using heating means 2, which may be a heating platen or other heating means as described before.

The rate of transverse movement of foam body 1 through densification zone 20, and the angle between the endless belt 11 and moving belt 16 are selected together such that the pressure on foam body 1 at all times in densification zone is less than the compressive strength at yield of the starting foam body. Preferably, the applied pressure is at least 50 kPa, and no greater than 300 kPa (but no greater than the compressive strength at yield of foam body 1). The reduction in the thickness of foam body 1 as it traverses densification zone 20 is therefore due essentially to the collapse of cells at the top surface and associated formation of densified layer 5. As seen in FIG. 3, densified layer 5 becomes thicker as foam body 1 moves through densification zone 20, while the thickness of the undensified portion 7 and that of foam body 1 decreases. In Example 3, as in all other figures, the thickness of densified layer 5 is again exaggerated for purposes of illustration.

Upon obtaining the desired amount of surface densification, foam body 1 then traverses cooling zone 21. In cooling zone 21, foam body 1 is supported from below by a second conveyor means (which as shown consists of rollers 17 and moving belt 18 but can include alternative apparatus as described above). Downward pressure and cooling are provided onto the top surface of densified layer 5 via a second pressure means (which as shown consists of rollers 13 and endless belt 14 but can be alternative apparatus as described before). Cooling means 6 provides direct or indirect cooling to the top surface of densified layer 5 of foam body 1. In cooling zone 21, the temperature of the densified layer is reduced from above the glass transition temperature of the styrenic polymer to 50° C. or less, as described before, while maintaining a pressure of at least 0.5 kPa but less than the compressive strength at yield of foam body 1.

Figure 4:
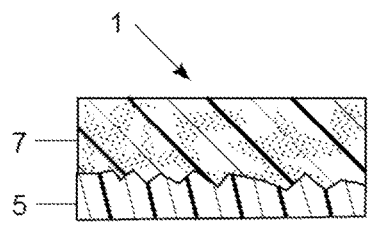
FIG. 4 is a side view of a densified foam body of the invention.
Figure 5:
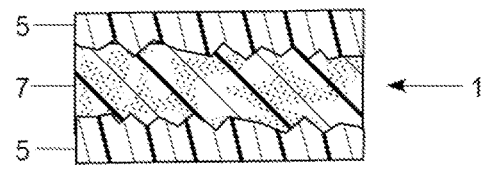
FIG. 5 is a side view of a second densified foam body of the invention.

The product is a monolithic polymer foam body having a densified skin on at least one major surface. An embodiment of such a polymer foam body is shown in FIG. 4. In FIG. 4, foam body 1 includes cellular (undensified) portion 7 and a single densified layer 5. Another embodiment is shown in FIG. 5. In the embodiment shown in FIG. 5, foam body 1 includes central cellular (undensified) portion 7 and densified layers 5 on each major surface. The cellular portion 7 in each case is at least 5 mm thick and preferably at least 10 mm thick. The cellular portion 7 may constitute, for example, 20 to 90% of the thickness of the partially densified foam body. Densified layers 7 may each be, for example, 0.5 to 10, especially 1 to 5 mm thick.

In FIGS. 1, 2 and 4-7, the interface between cellular portion 7 and densified layer 5 of foam body 1 is shown as being somewhat irregular. Although some irregularity in the thickness of densified layer or layers 5 can occur (leading to an irregular interface), the irregularity is exaggerated in FIGS. 1, 2 and 4-7 for purposes of illustration. In many cases, the interface will have very little if any irregularity.

The partially densified foam body of the invention is particularly useful for preparing foam laminate bodies in which a surface of a densified layer of the partially densified foam body is laminated to a layer of another material. If the partially densified foam body is densified on both sides according to the process of the invention, a layer of another material may be laminated to either or both sides of the foam body.

Figure 6:
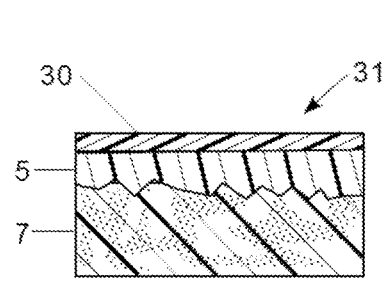
FIG. 6 is a side view of a laminate containing a foam body of the invention.

A simple bilayer laminate 31 is shown in FIG. 6. In FIG. 6, foam body 1 of the invention includes nondensified portion 7 and densified layer 5. Applied layer 30 is adhered to the surface of densified layer 5.

Applied layer 30 may be made of any of a wide range of materials, including a synthetic polymer, a natural polymer, a wood product such as wood itself, plywood, particleboard or oriented strand board, a metal, paper, a ceramic material, or other material. Applied layer 30 may be made of a single material or a combination of materials. It may be, for example, a laminate structure consisting of multiple layers.

Applied layer 30 may be solid, cellular, fibrous, particulate, or in other physical form as may be useful for the intended application.

In certain embodiments, the applied layer 30 adhered to a densified surface of the foam body of the invention is a fiber-reinforced polymer. The fiber-reinforced plastic includes a polymeric phase which is filled with reinforcing fibers. The polymer may be thermoplastic or thermosetting. The fibers can be any type of fibrous material including, for example, glass fibers or other ceramic fibers; carbon fibers; natural fibers of animal or plant origin such as cotton, hemp, linen, silk and wool; and polymeric fibers.

The fiber-reinforced polymer layers each may have fiber contents of, for example, 5 to 80% by weight, especially 25 to 70% by weight. The fibers are preferably glass, but may be any of the others described above. The polymer may be a thermoset such as a cured epoxy resin, a cured unsaturated polyester or an isocyanate-based polymer such as a polyurethane, a polyurea, a polyurethane-urea, a polyisocyanurate, or a polyurethane-isocyanurate. Alternatively, it might be a thermoplastic such as a polyolefin, a styrene homopolymer or copolymer, a polyester, a polycarbonate, a thermoplastic polyurethane, an acrylate polymer or copolymer, and the like. The fiber-reinforced polymer may be colored and/or contain graphics (writing, designs, logos, decorations, etc.) on an exposed surface. The fiber-reinforced polymer layer may have a thickness from, for example, 0.25 to 300 mm or more. A preferred thickness is 0.5 to 12 mm.

Figure 7:
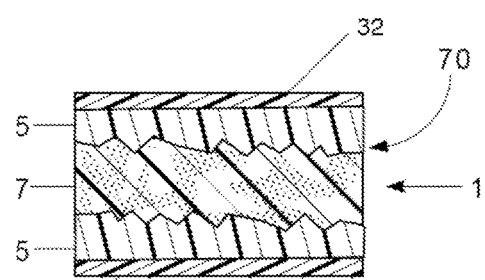
FIG. 7 is a side view of a second embodiment of a laminate containing a foam body of the invention.

A laminate of particular interest is a laminate having a core of the foam body of the invention, which is densified on both opposing sides in accordance with the invention, and which is bonded on each densified surface to a layer of a fiber-reinforced polymer to produce a sandwich structure in which the foam core forms the center. Such an embodiment is illustrated in FIG. 7. In FIG. 7, laminate 70 includes foam body 1, having a central non-densified portion 7 and outer densified layers 5 produced in accordance with the invention. Fiber-reinforced sheets 32 are bonded to the exposed surfaces of outer densified layers 5 of foam body via an adhesive layer (not shown) to form a three-layer laminate. Apart from the adhesive, there are in this embodiment no intervening layers between foam body 1 and fiber-reinforced sheets 32. If desired, one or more additional layers may be included on the outside of either or both of fiber-reinforced sheets 31.

Other layers may be present on the opposing side of either or both of the fiber-reinforced polymer layers.

Laminates as shown in FIG. 7 (optionally containing one or more additional outer layers as just described) are useful, for example, as thermal insulation panels for refrigerated vehicles, refrigerated spaces in buildings, and the like. In a laminate for such uses, the thickness of the undensified portion 7 of foam body 1 may be, for example, at least 10 mm thick or at least 20 mm thick or at least 40 mm thick. The volume density of the undensified portion 7 may be, for example 24 to 60 kg/m$^3$, or 28 to 50 kg/m$^3$. The area density of each of densified layers 5 may be 0.6 to 1.1 kg/m$^3$ or 0.7 to 0.95 kg/m$^3$, their volume densities each may be at least 200 kg/m$^3$ or at least 400 kg/m$^3$, and their thicknesses may be 0.5 to 5 mm or 1 to 3 mm. The fiber-reinforced plastic layers 31 each may have a thickness of 0.5 to 12 mm and may be glass-reinforced thermoset resins.

In these laminates, the fiber-reinforced plastic may be bonded to the foam body using any suitable adhesive, such as an epoxy adhesive, a urethane adhesive, a hot-melt adhesive or other type.

An advantage of the foam body of the invention is it bonds well to other materials and, when debond areas are present, the foam resists propagation and expansion of those debond areas much better than conventional foams. As a result, intermediate layers can be eliminated from the laminate, which leads to simplified assembly, lower cost, reduced weight (at constant laminate thickness), potentially greater foam thickness (at equivalent laminate thickness) to improve thermal insulation values.

The following examples are provided to illustrate the invention, not to limit the scope thereof. All parts and percentages are by weight unless otherwise indicated.

Examples 1 and 2

A polystyrene foam having a volume density of 39 kg/m$^3$ is cut into a sheet having a thickness of 55 mm, a width of 240 mm and a length of 260 mm. A Teflon sheet is placed on a metal plate heated at 160° C., and the polystyrene foam sheet is placed on the Teflon plate. A pressure of 50-300 kPa is applied on top of the polystyrene foam sheet. The bottom surface of the polystyrene sheet softens, and the cells collapse to form a densified layer. The sheet is held at that pressure until the thickness of the polystyrene foam sample is reduced to 40 mm. The sample is then removed and immediately placed on a metal plate at a temperature of 18° C. under a pressure of about 8 kPa for about 5 minutes, until the temperature of the densified layer is reduced to approximately room temperature.

The resulting partially densified foam body (Example 1) has an undensified portion about 38-38.5 mm thick and a volume density approximately that of the original foam, and a densified layer about 1.5-2 mm thick having a volume density of 400 kg/m$^3$. The foam body is then trimmed to dimensions 40 mm×200 mm×260 mm and cut into 40×40 mm×260 mm sections.

Example 2 is made in the same manner, except the starting foam body is 60 mm thick. After densification, the foam body has an undensified portion about 38 mm thick and a volume density approximately that of the original foam, and a densified layer about 2 mm thick having a volume density of 400 kg/m$^3$.

Three-layer laminates are made from each of Examples 1 and 2 by gluing a 2 mm thick aluminum sheet having an area density of 5.4 kg/m$^2$ to the undensified surface, using four grams of a two-part polyurethane adhesive. A 1.5 mm-thick glass fiber reinforced polyester sheet having an area density of about 2 kg/m$^2$ is glued to the densified surface of the foam body, using the same adhesive in the same amount, leaving a 60-mm long section of the polyester sheet unbounded at one end of the laminate. This unbound section simulates a debond patch. The assembly is compressed under an applied pressure of 20 kPa for 14 hours to cure the adhesive. This produces a laminate in which one end of the polyester sheet is not bonded to the foam body. The resulting laminates are designated Laminate Examples 1 and 2, respectively.

A comparative laminate (A) is made in the same way, except for the choice of foam core. The foam core in this case is a 40 mm×40 mm×260 mm section of the same polystyrene foam used to make Examples 1 and 2. This section has a volume density of 39 kg/m$^3$ and does not contain densified layers.

A second comparative laminate (B) is made as follows. A 40×40×260 mm section of the same, undensified polystyrene foam is glued one side to an aluminum sheet as described before. A 2 mm plywood sheet having a volume density of 850 kg/m$^3$ is glued to the other side of the foam section, and a layer of the fiber-reinforced polyester described already is glued on top of the plywood section, leaving a 60-mm unbounded section as before. This assembly is cured for 14 hours under pressure as with the other specimens.

The peel strength of each of the laminates is tested as follows. A loading block is glued to the debonded end of the glass-reinforced polyester (GRP) layer. Another loading block is glued to the opposing aluminum layer at the same end. Peel strength is then measured according to E2004-10 at a crosshead travel speed of 100 mm/min for a total displacement of 100 mm. The energy to peel is determined and the peeling energy is calculated as energy to peel divided by the peeled area resulting from the cross-head movement. In addition, the peeled samples are inspected visually to determine the failure mode. Results are as in Table 1.

TABLE 1

| Designation | Peel Energy, N/m | Failure Mode |
|---|---|---|
| Comparative A | 160 | Cohesive foam failure |
| Laminate Example 1 | >240 | Cohesive foam failure |
| Laminate Example 2 | N.D. | GRP cohesive failure |
| Comparative B | N.D. | GRP cohesive failure |

Comparative B represents the commonly-used practice in making panels for refrigerated vehicles, in which a plywood layer is interposed between the foam core and the GRP layer to reduce the propagation of debond areas. It represents a target performance level. As shown, Comparative Sample B fails due to the failure of the GRP sheet, rather than the foam core.

Comparative Sample A shows the effect of eliminating the plywood layer, using a foam core that is not densified on the bond surface. The peel energy is low, and the failure mode is foam cohesive failure.

Leaminate Examples 1 and 2 show the effect of this invention. In Laminate Example 1, the failure mode is still cohesive foam failure, but the peel energy is increased by over 50%. The composite is much more resistant to debond propagation. When the densified layer is slightly thicker, as in Laminate Example 2, foam failure is avoided entirely. Example 2 performs similarly to Comparative Sample B, without the need to interpose an intermediate, hard layer (the plywood) between the foam and the GRP layer.

Example 3

A polystyrene foam having a volume density of 39 kg/m$^3$ is cut into a sheet having a thickness of 80 mm, a width of 200 mm and a length of 260 mm. A Teflon sheet is placed on a metal plate heated at 160° C., and the polystyrene foam sheet is placed on the Teflon plate. A pressure of 50-300 kPa is applied on top of the polystyrene foam sheet. The bottom surface of the polystyrene sheet softens and the cells collapse to form a densified layer. The sheet is held at that pressure until the thickness of the polystyrene foam sample is reduced to 60 mm. The sample is then removed and immediately placed on a metal plate at a temperature of 18° C. under a pressure of about 8 kPa for about 5 minutes, until the temperature of the densified layer is reduced to approximately room temperature. The densification and cooling process is then repeated on the opposite side of the foam, until its thickness is reduced to 40 mm. The resulting partially densified foam (Example 3) has an undensified core about 36 mm thick and, on each side of the core, a densified layer about 2 mm thick. The densified layer volume density is about 400 kg/m$^3$.

The thermal conductivity (lambda value) and density of Example 3 are measured according to EN12667/EN8301-91 and EN1602/ISO 845-95, respectively.

For comparison (Comparative Sample C), the thermal conductivity and density of the starting foam (i.e., without densification) are measured.

As a further comparison (Comparative Sample D), a 36-mm thick section of the starting foam is made into a three-layer laminate by gluing a sheet of plywood as described before to each side. The thermal conductivity and density are measured.

Results of this testing are as reported in Table 2.

TABLE 2

| Designation | Lambda (mW/m · K) | Volume Density (kg/m$^3$) |
|---|---|---|
| Example 3 | 29.2 | 78 |
| Comparative C | 27.6 | 39 |
| Comparative D | 33 | 120 |

As can be seen from the data in Table 2, the partial densification process leads to only a small increase in lambda (Ex. 3 vs. Comp. Sample C). As a result, the partially densified foam can be used at equivalent thicknesses with only a minor loss in thermal insulation value. Comparative Sample D shows the effect of facing the foam layer with plywood (as is common in making insulation panels for refrigerated vehicles and buildings) and reducing the foam thickness to obtain the same overall sample thickness. Lambda increases about 20% compared to Comparative Sample C. This data illustrates a large advantage of substituting a partially densified foam of the invention for the conventional foam core/plywood assembly used as a core in thermal insulation panels.

Example 4

A polystyrene foam having a volume density of 39 kg/m$^3$ is cut into a sheet having a thickness of 70 mm, a width of 200 mm and a length of 260 mm. A Teflon sheet is placed on a metal plate heated at 160° C., and the polystyrene foam sheet is placed on the Teflon plate. A pressure of 50-300 kPa is applied on top of the polystyrene foam sheet. The bottom surface of the polystyrene sheet softens, and the cells collapse to form a densified layer. The sheet is held at that pressure until the thickness of the polystyrene foam sample is reduced to 55 mm. The sample is then removed and immediately placed on a metal plate at a temperature of 18° C. under a pressure of about 8 kPa for about 5 minutes, until the temperature of the densified layer is reduced to approximately room temperature. The densification and cooling process is then repeated on the opposite side of the foam, until its thickness is reduced to 40 mm. The resulting partially densified foam (Example 4) has an undensified core about 36-37 mm thick and, on each side of the core, a densified layer about 1.5-2 mm thick. The densified layer volume density is about 400 kg/m$^3$.

The compressive strength of Examples 3 and 4 is determined according to EN 826. The samples are cut to dimension of 40 mm thick×40 mm wide and 120 mm long. A WTF-EC-12 fixture (designed for ASTM C364 testing) is applied onto each end of the test specimen to prevent end failure. The foam is mounted with the densified surfaces parallel to the cross head movement direction. Results are as in Table 3.

The compressive strength of Comparative Sample C is evaluated in the same manner. Results are in Table 3.

TABLE 3

| Designation | Description | Compressive Strength at Yield, kPa |
|---|---|---|
| Example 3 | Densified on both sides | >1400 |
| Example 4 | Densified on both sides | >800 |
| Comp. C | Undensified foam | 330 |

This data illustrates a very large increase in compressive strength due to the partial densification of the foam.

What is claimed is:

1. A process for densifying a surface of a styrenic polymer foam, comprising:
   a) applying heat and pressure to at least one surface of a starting monolithic thermoplastic styrenic polymer foam which has a starting thickness of at least 25 mm and an elastic limit of 3-10% compression to locally heat said surface to a temperature above the glass transition temperature of the styrenic polymer while applying pressure of at least 50 kPa and up to 300 kPa but not greater than the compressive strength at yield of the starting monolithic thermoplastic polymer foam and collapse cells adjacent to said surface to form a densified skin on such surface and produce a multilayer monolithic foam having an undensified core having a thickness of at least 5 mm and a volume density of no greater than 80 kg/m$^3$, and at least one densified surface having an area density of at least 0.6 kg/m$^2$ and a volume density of at least 200 kg/m$^3$, and
   b) while maintaining pressure on the densified surface or surfaces of the multilayer monolithic foam, cooling the heated and densified surface(s) of the multilayer monolithic foam from a temperature above the glass transition temperature of the styrenic polymer to 50° C. or below, the maintained pressure being at least 1.5 kPa but insufficient to permanently deform the undensified core.

2. The process of claim 1, wherein the pressure in steps a) and b) is below the compressive strength of the starting polymer foam.

3. The process of claim 2, wherein in step a) a densified surface having a volume density of at least 400 kg/m$^3$ is produced.

4. The process of claim 3, wherein in step a) a densified surface having an area density of at least 0.8 kg/m$^2$ is produced.

5. The process of claim 3, wherein two opposing sides of the polymer foam are densified.

6. The process of claim 5, wherein the two opposing sides of the foam are densified sequentially by performing steps a) and b) on one side of the foam, and then performing steps a) and b) onto an opposing side of the foam.

7. The process of claim 5, wherein the two opposing sides of the foam are densified simultaneously by performing steps a) and b) on each of said opposing sides of the foam simultaneously.

8. The process of claim 1 wherein in step a) said heat and pressure are applied by contacting the starting monolithic thermoplastic styrenic polymer foam with a heated platen.

9. The process of claim 8 wherein step b) is performed by contacting the multilayer monolithic foam with a cooling platen that is a temperature below the glass transition temperature of the styrenic polymer.

10. The process of claim 1 wherein step b) is performed by contacting the multilayer monolithic foam with a cooling platen that is a temperature below the glass transition temperature of the styrenic polymer.

* * * * *